United States Patent [19]
Zebarth

[11] 3,955,703
[45] May 11, 1976

[54] COLLAPSIBLE SHIPPING CONTAINER

[76] Inventor: Ralph S. Zebarth, 203 Highland Lane, Blue Springs, Mo. 64015

[22] Filed: Apr. 10, 1975

[21] Appl. No.: 558,443

Related U.S. Application Data

[63] Continuation-in-part of Ser. No. 357,454, May 14, 1973, abandoned.

[52] U.S. Cl. .................................. 220/6; 220/7; 229/30; 206/508; 206/509
[51] Int. Cl.² ................. B65D 21/02; B65D 7/24; B65D 5/20
[58] Field of Search .............. 220/6, 7, 62, 4 F; 229/30; 206/503, 508, 509

[56] References Cited
UNITED STATES PATENTS

| | | | |
|---|---|---|---|
| 2,720,998 | 10/1955 | Potter | 220/6 |
| 2,944,695 | 7/1960 | Yusz | 206/508 |
| 3,133,662 | 5/1964 | Seidler | 220/355 |
| 3,207,357 | 9/1965 | Schmidt | 220/62 |
| 3,330,437 | 7/1967 | Bellamy | 220/6 |
| 3,349,289 | 10/1967 | Mueller | 220/62 |
| 3,360,180 | 12/1967 | Venturi | 220/6 |
| 3,414,156 | 12/1968 | Felldin | 220/6 |
| 3,446,415 | 5/1969 | Bromley | 229/30 |
| 3,611,994 | 10/1971 | Bailey | 220/6 |
| 3,809,278 | 5/1974 | Csumrile | 220/4 F |

*Primary Examiner*—George E. Lowrance
*Attorney, Agent, or Firm*—Pravel & Wilson

[57] ABSTRACT

A collapsible shipping container having overlapping upstanding walls and a collapsible reusable liner providing a sterile environment for the container contents when in the erected position. A removable lid effects a seal with the upstanding walls to prevent entry of undesired matter into the enclosed container and enable vertical stacking of a plurality of the containers.

15 Claims, 15 Drawing Figures

COLLAPSIBLE SHIPPING CONTAINER

CROSS-REFERENCE TO RELATED APPLICATION

This application is a continuation-in-part of my earlier filed co-pending application Ser. No. 357,454 having a filing date of May 14, 1973, now abandoned.

BACKGROUND OF THE INVENTION

This invention relates to the field of collapsible shipping containers.

While many inventors have in the past devised reusable shipping containers that collapse into a smaller volume for return shipment when empty, such containers have had several disadvantages. One such disadvantage was the use of complex and expensive latch devices such as disclosed in U.S. Pat. Nos. 1,176,332; 908,988; 1,004,414; 1,307,757; 2,720,998; 3,107,023 and 3,414,156. Attempts to provide quick operating latches to increase the speed with which the container may have been assembled or disassembled include U.S. Pat. Nos. 1,156,673 and 3,542,234. In U.S. Pat. No. 2,517,178 a latch means was disclosed which was resiliently deformable to hold the sides in the upright position, but in that arrangement gaps were required adjacent the bottom member of the container to enable the pivoting collapse of the container walls. In addition, U.S. Pat. Nos. 3,360,180 and 3,446,415 disclose collapsible containers having resiliently deformable latch means which require gaps in the side walls to enable pivoting erection and latching of the walls. These gaps or openings permitted entrance of dirt and other undesirable matter into the containers and the latches provided numerous crevices which were exceedingly difficult to clean and sterilize and therefore these containers were not suitable for the transportation of processed foods and other items of similar nature.

Sealable collapsible containers, such as those disclosed in U.S. Pat. Nos. 3,542,234 and 3,809,278, have been known, but required special seal elements which require additional maintenance and the containers were of such larger size as to be unwieldy and very difficult to sterilize. Further, the collapsible shipping containers disclosed in U.S. Pat. No. 3,809,278 have non-integral side walls which must be attached to a base member requiring additional special seal elements.

Several collapsible containers having side walls integrally attached to a base member have been known, such as those disclosed in U.S. Pat. Nos. 3,349,289; 3,330,437; 3,207,357; and 2,720,998. However, such containers required special latch means, mentioned hereinbefore, and were incapable of being vertically stacked in a nesting arrangement in both the collapsed position and the erect position without the probability of inadvertent movement during shipment. U.S. Pat. Nos. 3,133,662 and 2,944,695 disclose containers having raised lid portions and base members having recesses adapted for receiving the raised lid portion of another container to prevent inadvertent movement when the containers are vertically stacked. However, those containers are not of the collapsible type and require excessive space when shipped back to the point of origin.

SUMMARY OF THE INVENTION

This invention relates to a new and improved collapsible shipping container in which the pivoted upstanding walls are overlapped to protect the cargo while a removable lid seals with the upstanding walls to enclose the cargo. A collapsible sterile liner may be provided to protect the contents of the container.

An object of the present invention is to provide a new and improved collapsible shipping container.

A further object is to provide a new and improved collapsible container having a collapsible liner.

Yet another object is to provide a new and improved collapsible container for transporting processed foodstuffs in a protected and sanitary condition.

DESCRIPTION OF THE PREFERRED EMBODIMENTS

The collapsible shipping container of the present invention, generally designated 10 in the Figures, may be employed for transporting most types of cargo, but is preferably employed for transporting bulk shipments of processed foodstuffs such as poultry, meat and the like. The transportation of processed food requires that the shipping container provide a protected sterile environment for the cargo and certain other desirable features which will be set forth in greater detail hereinafter.

Figure 1:
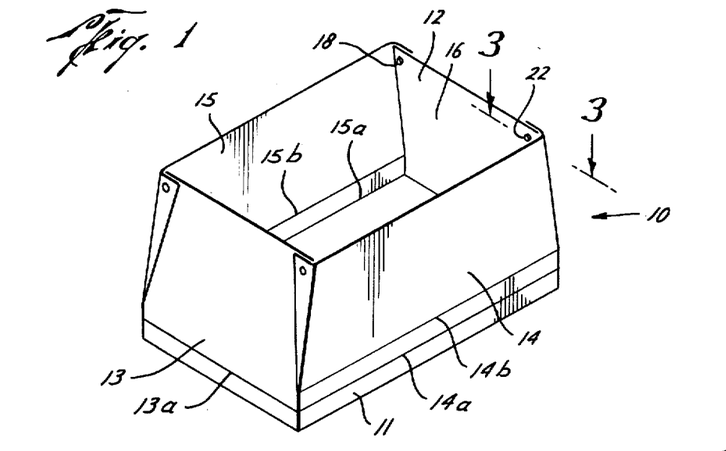
FIG. 1 is a perspective view of an erected collapsible shipping container of the present invention.
Figure 2:
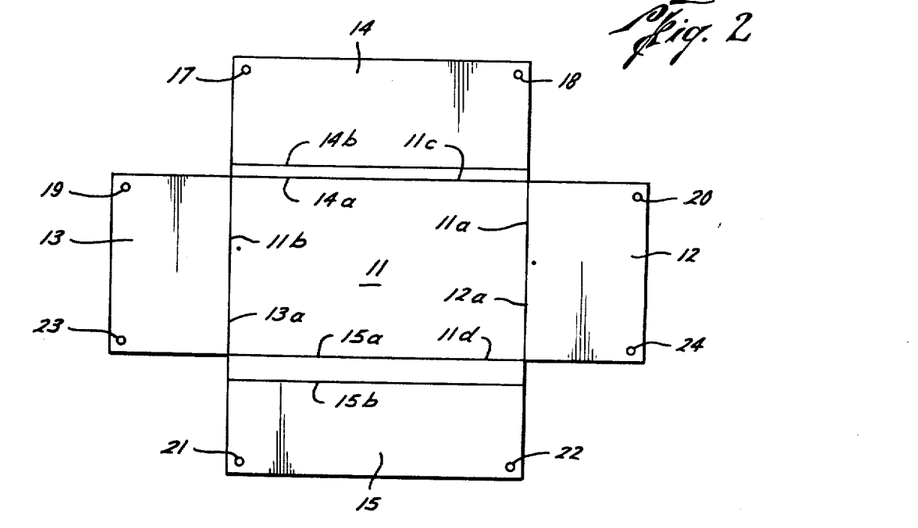
FIG. 2 is a view of the layout of the collapsible shipping container prior to erecting.

As illustrated in FIG. 2, the collapsible shipping container 10 includes a generally rectangular base or bottom member 11 having a pair of opposing end edges 11a and 11b and a pair of opposing side edges 11c and 11d. The container 10 further includes a pair of opposed end walls 12 and 13 pivotally connected with the base member 11 adjacent end edges 11a and 11b, respectively. Each of the end walls 12 and 13 have a bottom edge 12a and 13a, located adjacent the end edges 11a and 11b, respectively, of base member 11 to arrange for movement of the end walls 12 and 13 to and from a collapsed position parallel and substantially adjacent the base member 11 (FIG. 8) and an erected position substantially perpendicular to the base member 11 (FIG. 1).

The container 10 includes a pair of opposed side walls 14 and 15 having bottom edges 14a and 15a located adjacent side walls 11c and 11d, respectively, of the base member 11. In one embodiment of the present invention, the side walls 14 and 15 are pivotally connected with the base member 11 at edges 11c and 11d, but as will become more readily apparent hereinafter, fixed upstanding flanges of different heights arranged substantially perpendicular to the base member 11 may be employed.

The opposed side walls 14 and 15 are arranged for pivoting movement along edges 14b and 15b, respectively, for pivoting movement to and from a collapsed position where said side walls are located in a substantially adjacent parallel relationship and substantially parallel to the base member (FIG. 8) and an erected position where the side walls 14 and 15 are substantially perpendicular to the base member 11 (FIG. 1).

As illustrated in FIG. 2, one embodiment of the present invention contemplates the formation of the shipping container 10 from a single sheet or layer of plastic material, such as polyvinylchloride, but of course the present invention should not be considered so limited as the entire container may be formed from aluminum or other suitable material without departing from the scope of the present invention. In one embodiment, the container 10 is formed in the manner illustrated in FIG. 2 from a single piece of plastic material with the edges 11a, 11b, 11c, 11d, 14b and 15b being made of reduced thickness to enable pivoting of the end walls 12 and 13 and the side walls 14 and 15 in the desired manner. Obviously, the height of the end panels 12 and 13 should be less than half the length of the side walls 14 and 15 to enable their positioning adjacent the base member 11 in the same layer when they are moved to the colsed position. The hinge 15b is spaced a greater distance from the edge 15a than the hinge 14b is located from the edge 14a to enable the side wall 15 to fold over the side wall 14 when the side walls are moved to collapsed position (FIG. 8).

The container 10 includes a latching or locking means mounted with the opposed pairs of upstanding walls for securing each of the side walls 14 and 15 with both of the end walls 12 and 13 when the walls are in the erected position at a location spaced from the base member 11 to form a shipping receptacle 16 for receiving the processed poultry or other matter to be shipped. The means for securing includes a plurality of resilient deformable projections 17 and 18 formed on the side wall 14. Each of the projections 17 and 18 have a cross-sectional shape of a regular octagon or other suitable shape arranged to be received in the openings 19 of the end wall 13 and the opening 20 of the end wall 12, respectively, to secure the side wall 14 with walls 12 and 13 in an overlapping arrangement (FIG. 1) to exclude dirt and other undesirable contaminants from within the receptacle 16 when the container 10 is erected. Projections 21 and 22 on side wall 15 are resiliently secured within openings 23 of end wall 13 and opening 24 of end wall 12 for securing both end walls in a similar arrangement with the side wall 15.

Figures 5, 6, 7, 8:
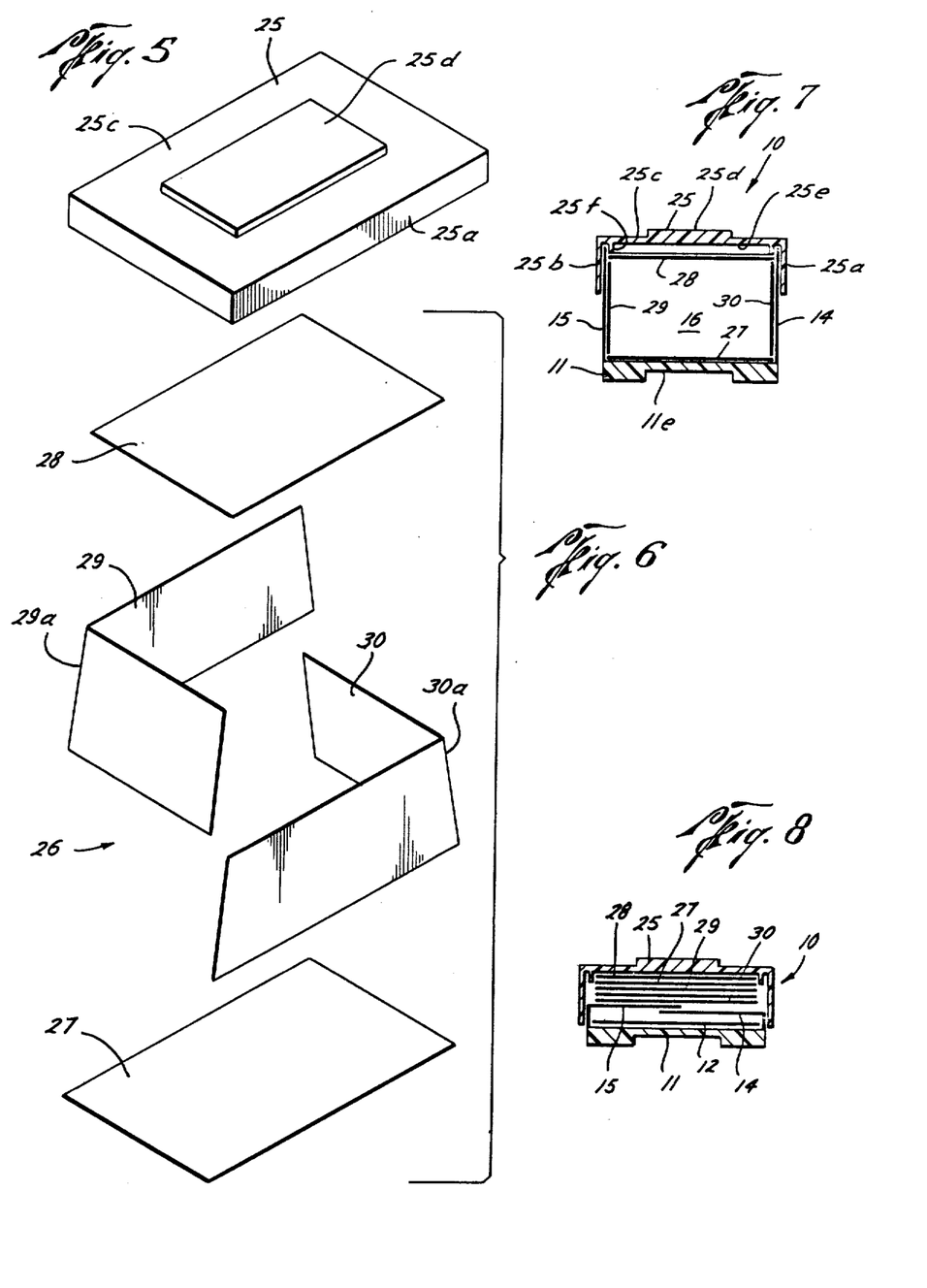
FIG. 5 is a perspective view of the container lid.
FIG. 6 is an exploded view of the arrangement of the collapsible liner of the present invention.
FIG. 7 is an end view, in section, of an erected container.
FIG. 8 is a view similar to FIG. 7 with the container and liner in the collapsed position.

The container 10 includes a lid 25, illustrated in FIG. 5, for mounting with the opposed end walls 12 and 13 and side walls 14 and 15 when they are in the erected position to substantially enclose the receptacle 16 to protect the processed poultry or other material positioned in the receptacle 16 for transportation. The lid 25 is also preferably formed of a plastic material and having a downwardly extending flange 25a extending about the periphery of the lid 25 which is also generally rectangular and of approximately the same size as the base member 11. As illustrated in FIG. 7, the flange 25a forms an inwardly facing sealing surface 25b which engages and effects a seal with the upper edge of the upstanding portion of side walls 14 and 15 and end walls 12 and 13 to block entry of dirt and other undesirable matter into the receptacle 16. The flange 25a is resiliently deformable to secure the lid 25 with the upstanding walls 12, 13, 14 and 15 in the erected position and with the base member 11 when the walls 11 and 12, 13 and 14 are in the collapsed position when the container is being returned (FIG. 8). The semi-rigid plastic material lid 25 is formed of sufficient thickness to support the vertical stacking of additional containers on the upper surface 25c thereof. In addition, the surface 25c is provided with a raised inner portion 25d dimensioned to fit within a recess 11e formed in the bottom of the base member 11 for nesting the containers 10 to prevent inadvertent movement of the stacked containers.

The container 10 may also include a reusable collapsible liner means, which is generally designated 26 in FIG. 6, for spacing the material to be shipped in the receptacle 16 from the lid 25, the base 11 and the upstanding walls 11, 12, 13 and 14 to protect the cargo from contact with undesirable elements such as dirt and moisture. The liner means 26 is preferably made of an insulating material for protecting the processed poultry material from spoilage and is collapsible to enable the liner to be returned with the box in the collapsed position for reuse. Preferably, the liner means 26 includes a bottom panel 27 and a top panel 28 of generally rectangular shape and dimensioned to fit adjacent the base member 11 and the lid 25, respectively, as illustrated in FIG. 7. The liner means 26 further includes a pair of upstanding plastic panels 29 and 30 which are pivoted at 29a and 30a, respectively, to enable the panels 29 and 30 to be assembled in receptacle 16 in the manner illustrated in FIG. 6 and to be pivoted and moved to a collapsed position which enables the stacking of insulating material in flat layers (FIG. 8). As the liner means 26 is preferably formed a quarter inch thick styrofoam sheets, the liner means 26 in the collapsed position will increase the thickness of the collapsed container slightly more than one inch and may be positioned between the collapsed side wall 15 and the lid 25 when the container 10 is being returned in the collapsed position. When such liner is employed with the present invention, it may be necessary to increase the extent of the flange 25a of the lid 25 for engaging and securing with the base member 11 when the container 10 is in the collapsed position.

The entire container 10 including the base 11, the pivoting upstanding walls 12, 13, 14 and 15, the lid 25 and the liner means 26, is preferably formed of any of the well known plastic materials that are both lightweight and which can be washed and resterilized for each shipment.

Figure 3:
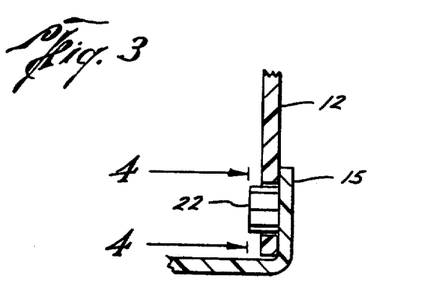
FIG. 3 is a detailed top view, partially in section, taken along line 3—3 of FIG. 1.
Figure 4:
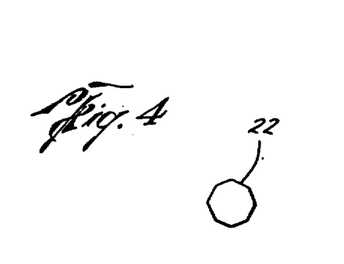
FIG. 4 is a view taken along line 4—4 of FIG. 3.

In the use and operation of the present invention, the container is assembled in the erected position by snapping or otherwise placing the projection within the corresponding openings in the adjacent end wall to achieve the overlapping wall arrangement as illustrated in FIG. 3. The bottom liner 27 and the upstanding wall liners 29 and 30 are then positioned in the container receptacle 16 which is then filled with the processed poultry or other matter to be shipped in the container 10. The upper insulating liner 28 is then placed in position and the lid 25 secured to the upstanding walls with the flange 25a for sealing the container 10.

When the container 10 arrives at its destination, the lid 25 is removed and the contents are withdrawn from the receptacle 16. The liner is removed from the receptacle and the projections removed from the corresponding openings to enable the end walls 12 and 13 to be moved to the collapsed position first and, as best illustrated in FIG. 8, the side wall 14 is then moved to the collapsed position followed by the side wall 15 movement to the collapsed position above and parallel to the side wall 14. If it is desired to return the liner means 26, the liner panels 29 and 30 are folded in a stack along with the liner panels 27 and 28 on the member 15 before placing the lid 25 on the collapsed walls and liner means 26 to engage base member 11 for securing the lid 25 with the base member 11 for the return trip in the collapsed condition.

It is within the scope of the present invention for the liner means 26 to include thin wall bags and the like for spacing the cargo from the container 10 to protect the cargo from contact with the undesired elements. Such liner bags may be made of transparent, translucent or opaque disposable plastic material such as polypropylene.

As illustrated in FIG. 7, a means for securing the container 10 in the erected position to prevent or block undesired movement to the container 10 to the collapsed portion may be provided by the flange 25e formed on the container 25. The flange 25 is located extending downwardly in a spaced parallel relationship with the flange 25a for receiving therebetween the upper portions of the upstanding walls and thereby securing them against inadvertent movement when the lid 25 is installed. The spacing between the flanges 25a and 25e is determined to hold the upstanding walls in sealing engagement with the surface 25b of the flange 25a.

Figures 9, 14, 15:
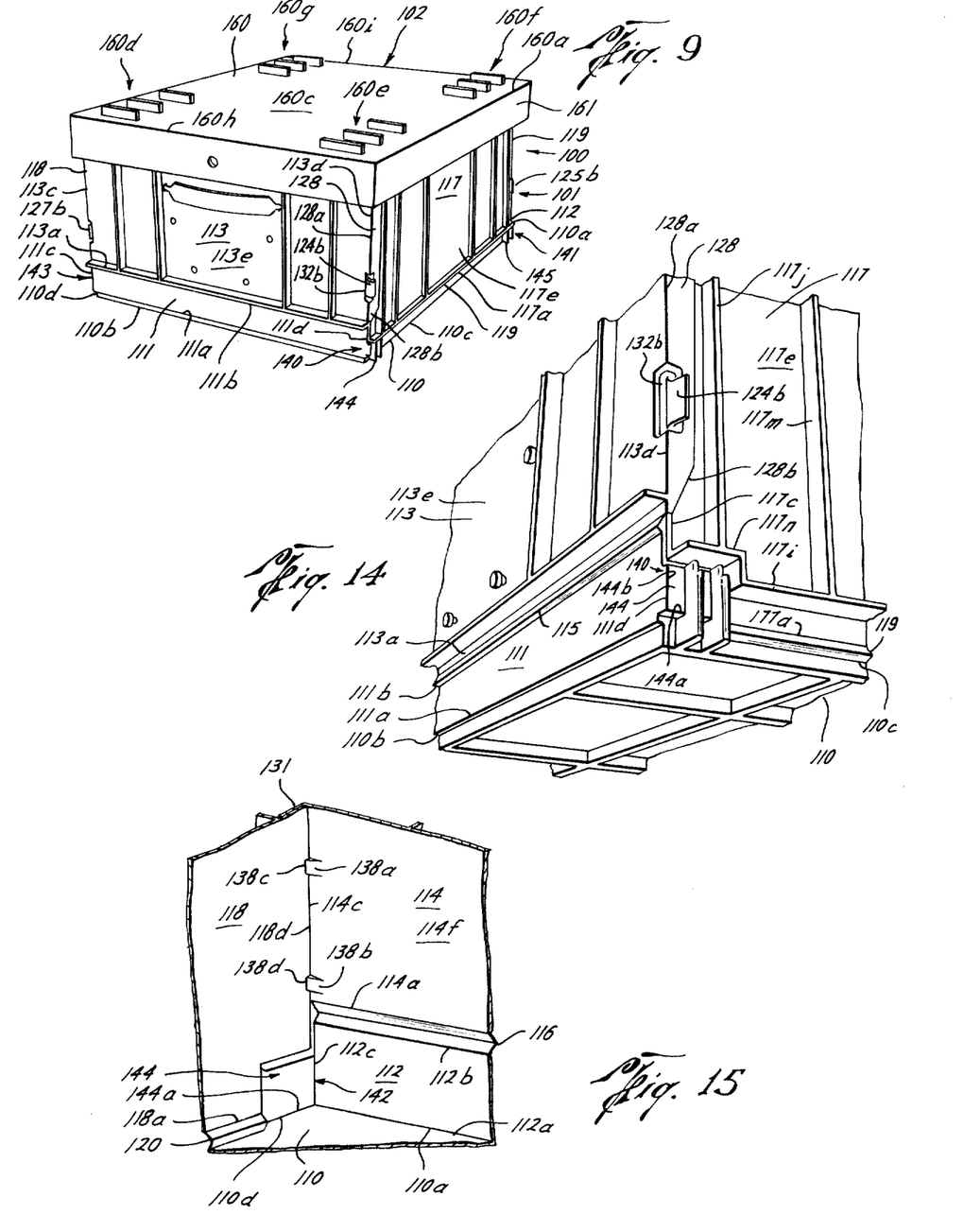
FIG. 9 is a perspective view in detail of the preferred embodiment of the inventive collapsible shipping container in the erected position.
FIG. 14 is a detailed perspective corner view, partially cut out, of one corner of the transporting member of the preferred embodiment which illustrates in detail certain means for interlocking the transporting member walls in the erected position and certain means for forming fixed reinforced corners.
FIG. 15 is an interior perspective view, partially cut out, of one corner of the transporting member of the preferred embodiment which illustrates in detail the arrangement of one corner of the transporting member in the erected position.
Figures 10, 11:
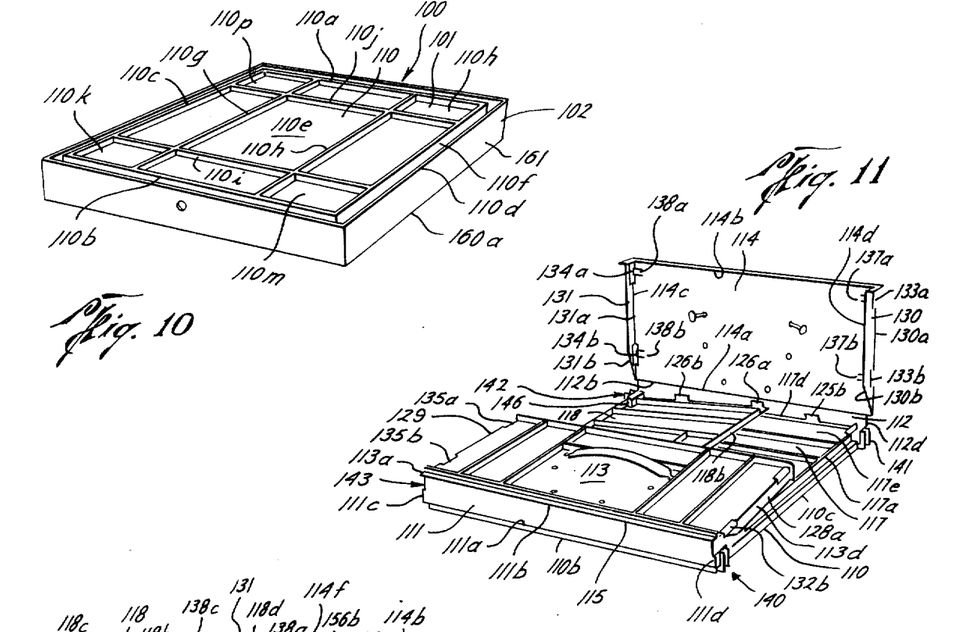
FIG. 10 is a perspective view of the preferred embodiment in the collapsed position and arranged for shipment or storage.
FIG. 11 is a perspective view of the transporting member of the preferred embodiment of the collapsible shipping container partially in the collapsed position.

Reference is now made to FIGS. 9 through 15 of the drawings which illustrate the preferred commercial embodiment of the collapsable shipping container of the invention. As illustrated in FIGS. 9 and 10, the collapsable shipping container, generally designated 100, is comprised of a cargo transporting member, generally 101 and a lid member, generally 102. The lid member 102 is adapted for mounting with the cargo transporting member 101 when it is in the erected position to form an enclosed shipping container, as shown in FIG. 9, and adapted to receive the cargo transporting member 101 in the collapsed position when not in use, as shown in FIG. 10. Each of these members, 101 and 102 respectively, are single predeterminedly shaped pieces formed from semirigid thermoplastic linear polyethylene. The employment of linear polyethylene provides enhanced structural strength to the inventive collapsable container 100 thereby enabling a plurality of containers to be vertically stacked while fully loaded with cargo such as poultry, meat and the like. Moreover, the employment of linear polyethylene enables the inventive collapsable containers to be subjected to rather severe washing and sterilization without loss of strength or deformation which is required for each shipment of processed food products.

In addition, specific colorants may be added to the linear polyethylene in the formation of the inventive containers 100 so as to provide a color code system for the shipment of certain types of food products without adverse affect on strength or form. For example, containers employed for the transportation of processed beef may be colored red, while those employed for transporting poultry may be colored white, and the like.

As illustrated in FIGS. 9 and 11 of the drawings, the cargo transporting member 101 includes a generally rectangular base or bottom member 110 defined by a pair of opposed end edges 110a, 110b and a pair of opposed side edges 110c and 110d. A pair of opposed fixed upstanding end flanges 111 and 112 are respectively attached to the opposing end edges 110c and 110d of the base member 110. Each of the opposed fixed upstanding end flanges 111 and 112 are substantially perpendicular to the plane of the base member 110 and extend upwardly therefrom respectively equal predetermined heights. In addition each fixed end flange 111, 112, has a bottom edge 111a, 112a, located adjacent the respective base member end edge 110a, 110b, an upper edge 111b, 112b, and a pair of opposing end edges 111c, 112c, and 111d, 112d, respectively.

Figures 12, 13:
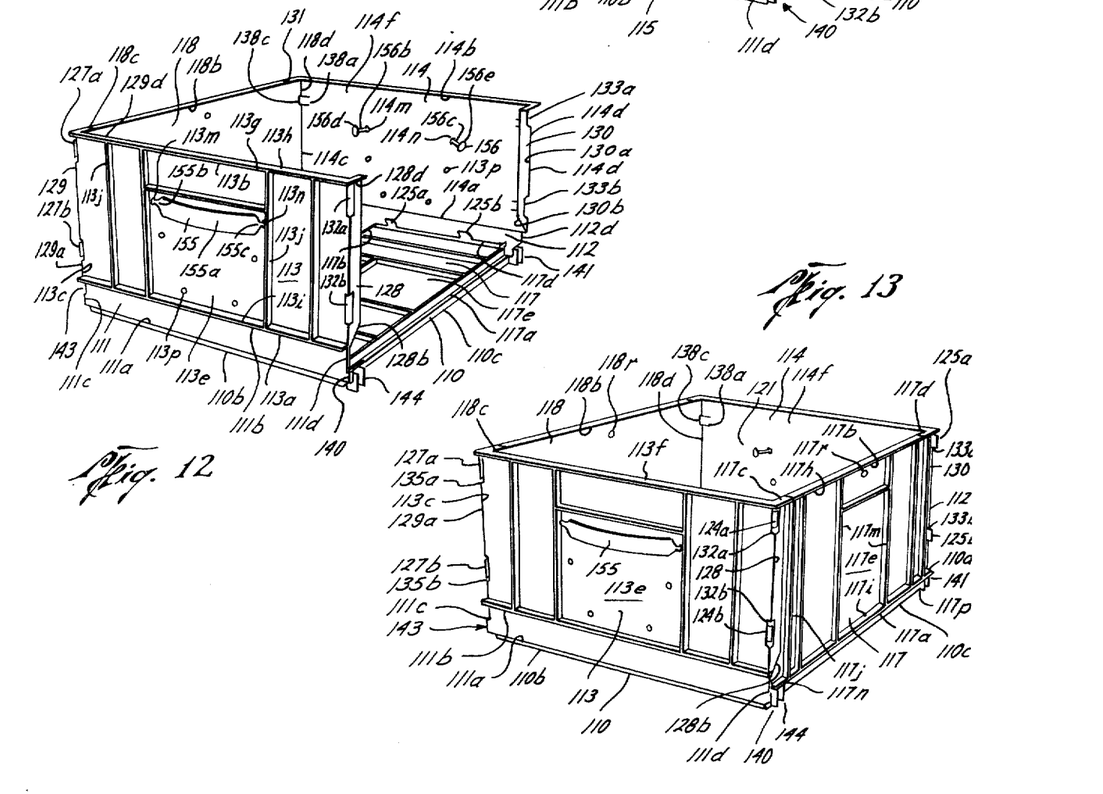
FIG. 12 is a perspective view of the transporting member partially in the erected position.
FIG. 13 is a perspective view of the transporting member in the full erected position.

The transporting member 101 further includes a pair of opposing end walls 113 and 114 connected with the opposed fixed upstanding end flanges 111 and 112. Each of the end walls 113 and 114 have a bottom edge 113a and 114a located adjacent the fixed flange upper edges 111b and 112b, each of which having reduced thicknesses (FIGS. 14 and 15) thereby forming integral hinges 115 and 116, respectively, to arrange for movement of the end walls 113 and 114 to and from a collapsed position parallel and substantially adjacent the base member 110 (FIG. 11) and an erected position substantially perpendicular to the base member 11 (FIGS. 9, 12 and 13). The end walls 113 and 114 have equal predetermined heights less than half the length of the base member 110 to allow them to be folded in a collapsed position substantially parallel to the base member 110 without overlap.

The transporting member 101 further includes a pair of opposed side walls 117 and 118 pivotally connected with the base member 110 and having bottom edges 117a and 118a located adjacent the opposing side edges 110c and 110d, respectively, of the base member 110. Similarly, the side walls 117 and 118 are connected with the base member 110 whereby the side wall bottom edges 117a, 118a and opposing base member side edges 110c, 110d, respectively, have reduced thicknesses forming integral hinges 119 and 120 to arrange for pivotal movement of the side walls 117 and 118 from a collapsed position to an erect position. Each of the side walls 117, 118 are substantially rectangular in shape having an upper edge 117b, 118b substantially parallel to the bottom edge 117a, 118a and a pair of opposed side edges 117c, 118c and 117d, 118d substantially perpendicular thereof, respectively. Further, the side walls 117 and 118 have equal predetermined heights greater than half, but less than the full width of the base member 110 whereby, in the collapsed position, the end walls 117 and 118 are substantially parallel and adjacent to the base member 110 in an overlapping arrangement, as shown in FIG. 11. In addition, the equal height of the end walls 117 and 118 are such that they are equal to the equal height of the end walls 113 and 114 when all are respectively arranged in the erected position substantially perpendicular to the base member 110 (FIG. 13).

The transporting member 101 also includes cooperating releasable interlocking means mounted with the opposed pairs of upstanding walls for releasably interlocking each of the side walls 117 and 118 with both of the side walls 113 and 114 in an overlapping arrangement to form a substantially cubical shipping receptacle 121 for receiving the processed food items to be shipped when the walls are in the erected position (FIG. 13). The releasable interlocking means are spaced from the base member 110 a predetermined distance and include a plurality of semi-rigid deformable outwardly extending tabs 124a, 124b, and 125a, 125b and 126a, 126b, 127a, 127b fixedly connected with the opposing side edges 117c, 117d and 118c, 118d of the opposing side walls 117 and 118, respectively. Each of the tabs 124a, 124b, 125a, 125b, 126a, 126b, 127a and 127b have a substantially arcuate rectangular shape, and extend outwardly a predetermined distance at an angle of less than 90° from the outer surface 117e and 118e of each of the side walls 117 and 118. As shown in FIGS. 11 and 13, each side wall 117 and 118 includes a pair of upper tabs 124a, 125a, and 126a, 127a attached to the respective side edges 117c, 117d and 118c, 118d which are positioned a predetermined distance slightly below the respective upper wall edges 117b and 118b. A pair of lower outstanding tabs 124b, 125b, and 126b, 127b are also attached to the respective side edges 117c, 117d and 118c, 118d and are positioned a predetermined distance above the respective bottom edges 117a and 118a in spaced relationship thereto.

The means for interlocking the upstanding walls further includes a plurality of fixed outstanding support flanges 128, 129, 130 and 131, perpendicularly connected with the the opposing end walls 113 and 114. Each of the support flanges 128, 129, 130 and 131 have a side edge 128a, 129a, 130a, 131a, located adjacent the respective side edges 113c, 113d and 114c, 114d of each of the end walls 113 and 114 and extends perpendicularly an equal predetermined distance from the respective end wall 113 and 114 to which it is connected with. Further, as shown in FIG. 3, the support flanges 128, 129 and 130, 131 connected with each respective end wall 113 and 114 are disposed substantially parallel relative to each other and are disposed outwardly of the side walls 117, 118 in the erected position in an overlapping arrangement to prevent dirt and other contaminates from entering the shipping receptacle 121.

A plurality of upper openings, 132a, 133a, 134a, 135a and lower openings 132b, 133b, 134b and 135b are provided at the respective junctures of each end wall 113 and 118 with each respective support flange 128, 129 and 130, 131. Each of the upper openings 132a, 133a, 134a and 135a and lower openings 132b, 133b, 134b, and 135b, has a perpendicular-rectangular shape and is disposed a predetermined distance from the respective upper end wall edge 113b, 114b or bottom end wall edges 113a, 114a and arranged to receive one of the respective outwardly extending upper tabs 124a, 125a, 126a, 127a, or lower tabs 124b, 125b, 126b, 127b of the respective opposing side walls 117 and 118 in an interlocking relationship to releasably interlock each of the side walls 117, 118 with both of the end walls 113, 114.

Each side wall 113 and 114 also has a plurality of angled abutments 136a, 136b, 137a, 137b 138a, 138b, 139a, and 139b extending outwardly from the respective inner surfaces 113f and 114f spaced adjacent each of the openings 132a, 132b, 133a, 133b, 134a, 134b, 135a, and 135b for holding each of the side wall tabs 124a, 124b, 125a, 125b and 126a, 126b, 127a, 127b received therein in a forced interlocked position. Each of the abutments 136a, 136b, 137a, 137b, 138a, 138b, 139a, and 139b are angled outwardly from the respective end wall inner surfaces 113f and 114f and have an abutting surface 136c, 136d, 137c, 137d 138c, 138d, 139c and 139d perpendicular thereto adjacent each opening 132a, 132b, 133a, 133b and 134a, 134b, 135a, 135b which is spaced from each respective support flange 128, 129, 130 and 131 a distance substantially equal to the thickness of each respective side wall 117 and 118 (FIG. 15).

Reference is now made to FIG. 11 which illustrates the transporting member 101 in a partially collapsed position. In the collapsed position, the side walls 117 and 118 are folded in an overlapping arrangement substantially parallel and adjacent to the base member 110. The opposing end walls 113 and 114 are folded over the side walls 117 and 118 substantially parallel to the base member 110. When it is desired to place the transporting member 101 in the erected position to form the shipping receptacle 121, the end walls 113 and 114 are first folded upwardly substantially perpendicular to the base member 110 (FIG. 11). One of the end walls (118, FIG. 12) is then folded upwardly and the outwardly extending tabs 126a, 126b, and 127a, 127b thereof are forced through the respective openings 134a, 134b of end wall 114 and openings 135a, 135b of the end wall 113. The remaining side wall (117 in FIG. 13) is then folded upwardly in a similar manner whereby the side wall tabs 124a, 124b and 125a, 125b are deformably forced through the openings 132a, 132b of the end wall 113 and openings 133a, 133b of the end wall 114. Each of the upper tabs 124a, 125a and 126a, 127a and lower tabs 124b, 125b and 126b, 127b of each respective side wall 117 and 118 are angled towards each other and cooperate with the abutments 136a, 137a, 138a, 139a and 136b, 137b, 138b, 139b of the end walls 113 and 114 to fixedly interlock each of the side walls 117, 118 with both of the end walls 113, 114 in a manner whereby involuntary disassembly is fully eliminated. Each of the tabs and abutments are sufficiently resiliently deformable to enable the tabs to be inserted through the respective openings with relative ease. In addition, the abutments are angled sufficiently to enable the side walls 117, 118 to be forcibly slipped over without difficulty. However, the abutment perpendicular surfaces 136c, 136d, 137c, 137d, 138c, 138d, 139c and 139d, along with the angulation of the tabs and overlapping arrangement of the outwardly disposed support flanges to prevent movement of the tabs from the respective openings without exertion of force on the outer surfaces 117e, 118e of the side walls 117, 118 for disassembly.

As shown in FIG. 13, when the transporting member 101 is in the erect position each of the support flanges 128, 129 and 130, 131 abut the outer surfaces 117e and 118e of each of the respective opposed side walls 117 and 118 adjacent the respective opposed side edges 117c, 117d and 118c, 118d in an overlapping arrangement to exclude undesirable contaminants from within the receptacle 121, mentioned before. The overlapping arrangement also enhances vertical and interlocking strength of the interlocking means to enable a plurality of the inventive shipping containers 100 to be vertically stacked fully loaded with products. Further, each of the support flanges 128, 129, 130 and 131 have angled bottom edges 128b, 129b, 130b and 131b to allow the respective side walls 113, 114 to be freely moved to the collapsed position for reasons more readily apparent hereafter.

The transporting member 101 further includes means for forming a plurality of fixed upstanding reinforced corners 140, 141, 142 and 143 respectively mounted perpendicularly with the base member 110 adjacent the junctures of each of the opposed end edges 110a and 110b with the opposed side edges 110c and 110d for enhancing the vertical strength of the transporting member 101 and for protecting the respective interlocking means in the erect position. Each of the means for forming fixed reinforced corners 140, 141, 142 and 143 are identical and, for the purpose of brevity, only one will be specifically described herein. As illustrated in FIG. 14, the means for forming the fixed reinforced corner 140 includes a fixed upstanding vertical corner wall 144 having a bottom edge 144a located adjacent to and connected with the base member side edge 110c, and a side edge 144b located adjacent to and connected with the fixed upstanding end flange side wall 111d. The fixed upstanding corner wall 144 is perpendicular to the base member 110 and the upstanding end flange 111 respectively, and thus cooperates therewith to form the fixed reinforced corner means 140. Similarly, the reinforced corner means 141, 142, and 143 have upstanding corner walls with bottom and side edges respectively attached to the base member side walls 110c, 110d at their junctures with the base member end walls 110a, 110b and the end flange side walls 111c, 112c and 112d.

As illustrated in FIG. 14, the upstanding corner wall 114 has a predetermined width and height less than the height of the upstanding end flange 111. The side wall 117 thus has a corner notch 117g located adjacent the side edge 117c and bottom edge 117a which has a predetermined height and width substantially equal to the height and width of the upstanding corner wall 114. Similarly, notches are provided adjacent the juncture of side wall edge 117c and bottom wall 117a as well as adjacent to the junctures of the side wall edges 118c, 118d with the bottom edge 118a of the side wall 118 of the corner means 141, 142 and 143. The notches of the side walls 117, 118 cooperate with the corner walls of the reinforced corner means 140, 141, 142 and 143 to allow the side walls 117 and 118 to be folded upwardly in the erected position substantially perpendicular to the base member 110 whereby the respective corner walls are located in the same plane substantially perpendicular to the base member 110.

Each of the corner walls 144 also have a pair of vertical outstanding reinforcing ribs 144b extending outwardly equal predetermined distances substantially perpendicular thereto. The vertical outstanding ribs 114c provide additional reinforcing support and protection to the corner means 140, 141, 142, 143 and to the interlocked side walls 117, 118 and end walls 113, 114 in the erected position when a plurality of containers 110 are vertically stacked in a nesting arrangement.

Additionally, each of the opposing end walls 113, 114, opposing side walls 117, 118 and the base member 110 have reinforcing means mounted with each of the respective outer surfaces 113e, 114e, 117e, 118e and bottom surface 110e for increasing the horizontal and vertical strength of each member. As shown in FIG. 10, reinforcing means mounted with the base member 110 includes an outstanding peripheral rib 110f, a pair of outstanding longitudinal ribs 110g, 110h and a pair of outstanding transverse ribs 110i, 110j each perpendicularly connected with the bottom surface 110e and extending outwardly therefrom equal predetermined distances. The outstanding peripheral rib 110f extends about the periphery of the base member 110 substantially adjacent the opposing end edges 110a, 110b and side edges 110c, 110d. The outstanding longitudinal ribs 110g, 110h are spaced at equal distances from the side edges 110c and 110d, respectively, and are parallel thereto and to each other. The outstanding longitudinal ribs 110g, 110h also extend the entire length of the base member 110 and are attached at their respective opposing ends with the outstanding peripheral rib 110f. The transverse ribs 110i, 110j similarly extend parallel to each other and to each respective opposed end edge 110a and 110b across the entire width of the base member 110. Each of the outstanding transverse ribs 110i, 110j are attached at their respective ends to the outstanding peripheral rib 110f and are spaced from the respective side edges 110a and 110b equal predetermined distances which are equal to the distances the longitudinal ribs 110g, 110h are spaced from the respective side edges 110c and 110d. The pair of longitudinal ribs 110g and 110h and the pair of transverse ribs 110i and 110j intersect and are attached to each other perpendicularly. All of the longitudinal ribs 110g, 110h, transverse ribs 110i, 110j and the peripheral rib 110f are arranged to form a plurality of recessed squares 110k, 110m, 110n, 110p adjacent each corner of the base member 110, the functions of which will be more fully explained hereafter.

The reinforcing means mounted with each side wall 117 and 118 are identical and, therefore, only one will be described herein. As shown in FIG. 13, the reinforcing means mounted with the outer side wall surface 117e includes an outstanding upper rim 117h, an outstanding bottom rib 117i, and pair of opposing side ribs 117j, 117k, a plurality of outstanding vertical ribs 117m and a pair of notch ribs 117n, 117p, each of which are perpendicularly attached to the side wall outer surface 117e and extend outwardly equal predetermined distances therefrom. The upper rib 117h has an upper horizontal surface 117q of a predetermined length and is perpendicularly attached adjacent the side wall upper edge 117b. The bottom rib 117i extends between the side wall notches 117f, 117g substantially parallel with the side wall bottom edge 117a and its based an equal predetermined distance therefrom. Each of the notch ribs 117n, 117p is positioned adjacent each notch 117f, 117g and is attached to an opposing end of the bottom rib 117i. The opposing side ribs 117j, 117k are respectively attached at one end to the opposing ends of the upper rib 117h and at their opposing ends to the respective notch ribs 117n, 117p. The side ribs 117j, 117k are disposed parallel to the side wall edges 117c, 117d a predetermined distance substantially equal to the width of the support flanges 128, 130 and thus not only function to provide reinforcing support to the side wall 117 but also function to provided added vertical support to the interlocking means when the opposing walls are in the erected position, described hereinbefore. The plurality of vertical support ribs 117m are positioned between the side ribs 117j, 117k in spaced parallel relationship thereto and extend perpendicularly between the upper rib 117h and the bottom rib 117i. All of the reinforcing ribs cooperate to provide the above-mentioned reinforcing support to the side wall 117 and thus enable the wall to be integrally formed from linear polyethylene at a minimum desired thickness.

The reinforcing means mounted with the opposing end walls 113 and 114 are also identical to each other and, for the purpose of brevity, only one will be described. Each of the reinforcing means are mounted to the respective opposing end wall outer surfaces 113e, 114e and extend therefrom from substantially equal predetermined distances perpendicularly thereto and provide reinforcing vertical support to enable the walls to be formed from the linear polyethylene at minimum desired thickness. Referring to FIG. 12, the reinforcing means mounted with the end wall outer surface 113e includes an integral outstanding U-shaped upper rib 113g having an upper surface 113h attached to and extending along the length of the end wall upper edge 113b and the respective support flange upper edges 128d and 129d. An outstanding bottom rib 113a, located adjacent the end wall bottom edge 113a and extending parallel thereto, and a plurality of outstanding parallel vertical ribs 113j extending perpendicular between the bottom rib 113i and the upper rib 113g are also included. Further, an outstanding horizontal rib 113k is provided which extends between the intermost pair of vertical ribs 113j and is positioned a predetermined distance substantially parallel with the upper rib 113g. All of the respective ribs are perpendicularly attached to the respective outer end wall surfaces 113e and 114e and extend outwardly therefrom substantially equal predetermined distances. The rims corroborate to provide the vertical and horizontal strength to the end walls 113 and 114.

As shown in FIG. 12, each end wall 113 and 114 has a pair of openings 113m, 113n and 114m, 114n, extending therethrough preferably rectangular in shape, that are adapted to receive handle members 155 and 156 for removable mounting with the respective end walls 113, 114 for conveniently carrying the shipping container 100 in the erect position. Each handle member 155, 156 is integrally molded from any type of desirable resilient deformable thermoplastic material and identical in shape and structure. As illustrated each handle member 155, 156 incudes a substantially rectangular handle 155a, having a pair of opposing end projections 155b and 155c and 156b, and 156c, respectively. The opposing end projections 155b, 155c and 156b, 156c are preferably substantially cylindrical in form having a diameter sufficient for insertion through the end wall openings 113m, 113n and 114m, 114n. Resiliently deformable tabs 155d, 155e and 156d, 156e are perpendicularly attached to the ends of the cylindrical projections 155b, 155c and 156b, 156c which are adapted to be received in the side wall openings 113m, 113n and 114m, 114n to secure the handle members 155 and 156 to the respective side walls 113 and 114.

Each opposing end wall 113 and 114 further includes a plurality of projections 113p and 114p in spaced relationship with each other which protrude outwardly from the end wall outer surfaces 113e and 114e. Each of the projections 113p, 114p have a partial slit (not shown) substantially parallel to the respective planes of the end wall 113 and 114 which are adapted to receive a card or the like for identifying the contents of the inventive container when in use.

Referring to FIG. 9, the preferred embodiment of the inventive collapsible shipping container 100 also includes a lid member 102 which is adapted for mounting with the opposed end walls 113, 114 and side walls 117, 118 when they are releasably interlocked in the erected position to substantially enclose the receptacle 121 of the transporting member 101 to protect processed food products or other cargo therein during shipment. The lid member 102 is also adapted for receiving and carrying the transporting member 101 in the collapsed position, as shown in FIG. 10, when the lid member 102 is positioned in the inverted position whereby the collapsed shipping container 100 requires only a minimum amount of space when transported in the collapsed position. As mentioned hereinbefore, the lid member 102 is integrally formed from semi-rigid thermoplastic linear polyethylene as a single predeterminedly shaped piece having enhanced strength for vertical stacking of a plurality of containers either in the collapsed position or the erected position loaded with cargo. The lid member 102 includes a substantially rectangular lid 160 having a size slightly in excess of the size of the rectangular shaped base member 110, and an outwardly extending peripheral skirt 161 connected with the lid 160 about its periphery 160a. The peripheral skirt 161 is perpendicular to the plane of the lid 160 and extends outwardly therefrom a predetermined distance. When the lid member is positioned in the inverted position for receiving and carrying the collapsed transporting member 101 (FIG. 10), the peripheral skirt 161 is disposed outwardly from the periphery of the transporting member 101 holding it adjacent to the lid bottom surface (not shown). Similarly, when the lid member 102 is positioned for mounting the peripheral skirt 161 is disposed outwardly in overlapping arrangement with the opposing end walls 113, 114 and opposing side walls 117, 118 when they are releasably interlocked in the erect position (FIG. 9). The skirt 161 forms an inwardly facing sealing surface (not shown) which engages and effects a seal with the respective outwardly extending side wall upper ribs 117h, 118h and outwardly extending end wall upper ribs 113g, 114g to prevent entry of undesirable contaminants into the enclosed receptacle 121. The peripheral skirt 161 is sufficiently resiliently deformable to enable it to engage and effect a seal with the respective upper ribs of each end wall 113, 114 and side walls 117, 118.

The collapsible shipping container 100 also includes cooperating means respectively mounted with the upper surface 160c of the lid 160 and the bottom surface 110e of the base member 110 for preventing inadvertent relative movement when the shipping container 100 is vertically stacked relative to a corresponding second shipping container 100. The cooperating means includes a plurality of fixed upstanding finger groupings 160d, 160e, 160f and 160g perpendicularly connected with the lid upper surface 160c and extending outwardly therefrom substantially equal predetermined distances. The upwardly extending finger groupings 160d, 160e, 160f and 160g are disposed a predetermined distance from the lid periphery 160a and are substantially parallel to each other and to the opposing end edges 160h, 160i of the lid 160 respectively. The cooperating means for preventing inadvertant relative movement also includes the peripheral rib 110f, longitudinal ribs 110g, 110h and transverse ribs 110i, 110j connected with the base member bottom surface 110e, described hereinbefore, which are arranged to form the plurality of recessed squares 110k, 110m, 110n, 110p. The plurality of recessed squares 110k, 110m, 110n, and 110p are adapted to receive the finger groupings 160d, 160e, 160f and 160g of the lid member 102 of a corresponding container 100 for nesting the containers 100 in a vertical arrangement to prevent inadvertant horizontal movement of the vertically stacked containers.

In addition, as illustrated in FIG. 13 each side wall 117, 118 of the transporting member 101 has an opening 117r, 118r extending therethrough and disposed a predetermined distance from each respective upper edge 117b, 118b to provide protected ventilation to the shipping receptacle 121 when the transporting member is in the erected position. When the transporting member 101 is in the erected position and the lid member 102 is mounted thereon (FIG. 9), as described hereinbefore, the outwardly extending peripheral skirt of the skirt 161 of the lid member 102 extends outwardly of the respective side walls 117, 118 and prevents entry of contaminants through the vent openings 117r, and 118r, respectively.

In the use and operation of the preferred embodiment of the invention, the transporting member 101 is assembled in the erected position by interlocking the outwardly extending side wall tabs within the corresponding end wall openings in the adjacent end walls to achieve the releasably interlocked overlapping wall arrangement as shown in FIG. 13. The shipping receptacle 121 thus formed is then filled with processed food items, such as poultry, beef or like items to be shipped in the container 100. Where it is desirable, the liner means 26, described hereinbefore and shown in FIGS. 5 and 7, may be employed with the preferred commercial embodiment. The lid member 102 is then secured to the upstanding walls of the transporting member for enclosing the shipping receptacle 121 in a sealing arrangement.

After the container is shipped to its destination, the lid member 102 is removed and the contents shipped are withdrawn from the receptacle 121 along with the liner means 26, where employed. Each of the side walls 117, 118 are then pivotally moved to the collapsed position by removing the interlocked tabs from the corresponding openings and folding the side walls 117, 118 adjacent and substantially parallel to the base member 110 in an overlapping arrangement. The end walls 113, 114 are then pivotally folded over the folded side walls 117, 118 substantially parallel to the base member 110 (FIG. 11). The lid member 102 and collapsed transporting member 101 are then placed in an inverted position and the transporting member 101 is then nested atop the lid member 102 adjacent its lid bottom surface whereby the lid peripheral skirt 161 is disposed outwardly from the base member 110, as shown in FIG. 10. The collapsed shipping container 100 may then be shipped back in a vertical stacked arrangement with corresponding containers to its point or origin for reuse.

The foregoing disclosure and description of the invention are illustrative and explanatory thereof, and various changes in the size and shape as well as the details of the illustrative construction may be made without departing from the spirit of the invention.

I claim:

1. A collapsible shipping container formed of a semi-rigid thermoplastic material and adapted for stacking in a vertical relationship with a corresponding collapsible shipping container in an erect position and a collapsed position, comprising:

an integrally formed predeterminedly shaped transporting member adapted for folding to and from a collapsed position and an erected position forming a shipping receptacle for receiving cargo, said transporting member comprising:

a generally rectangular base member having a pair of opposing end edges and a pair of opposing side edges;

a pair of opposed fixed upstanding end flanges perpendicularly connected with said base member, each of said upstanding end flanges having a bottom edge located adjacent one of said opposing end edges, a pair of opposing side edges and an upper edge substantially parallel to and located a predetermined distance from the bottom edge;

a pair of opposed end walls pivotally connected with said pair of opposed fixed upstanding end flanges with each of said opposed end walls having a bottom edge located adjacent the upper edge of each upstanding end flange, a pair of opposing side edges and an upper edge substantially parallel to and located a predetermined distance from said bottom edge, said pair of opposed end walls being arranged for movement to and from a collapsed position substantially adjacent and parallel to said base member and an erected position substantially perpendicular to said base member;

a pair of opposed side walls pivotally connected with said base member with each of said opposed side walls having a bottom edge located adjacent one of said opposing side edges, a pair of opposing end edges and an upper edge parallel to and located a predetermined distance from said bottom edge, said pair of opposed side walls being arranged for movement to and from a collapsed position adjacent to said base member and an erected position substantially perpendicular to said base member;

means mounted with each of said side walls and said end walls for releasably interlocking each of said side walls with both of said end walls in an overlapping arrangement when said side walls and end walls are in the erected position to form the shipping receptacle adapted for receiving cargo;

means mounted with said base member for forming a plurality of fixed upstanding reinforced corners substantially perpendicular thereto located at the junctures of said opposing end edges with said opposing side edges of said base member, said reinforced corners adapted to provide reinforcing support and protection to said interlocking means when said side walls and side end walls are interlocked in the erected position; and an integrally formed predeterminedly shaped lid member adapted for mounting with the opposed edges of said end walls and side walls of the transporting member in the erected position to form an enclosed shipping receptacle for shipping cargo and for receiving and carrying said transporting member in the collapsed position, said lid member comprising:
  a lid having a generally rectangular shape and a size slightly greater than the size of said base member of the transporting member; and
  a fixed outwardly extending peripheral flange perpendicularly connected with said lid about its periphery, said peripheral flange extending outward a predetermined distance thereto;
  said lid member being positioned for mounting with the upper edges of said opposed end walls and side walls in the erected position whereby the peripheral flange is disposed outwardly therefrom to provide said enclosed shipping receptacle; and
  said lid member being positionable in an inverted position having said transporting member positioned adjacently therein when said side walls and end walls are in the collapsed position whereby the peripheral flange is disposed outwardly of said base member and said side walls and end walls for carrying the collapsible container in the collapsed position; and
  cooperating means respectively mounted with the lid member and the base member of said transporting member for preventing inadvertent relative movement when the shipping container is vertically stacked relative to a corresponding shipping container.

2. The apparatus as set forth in claim 1, wherein said means for interlocking includes:
  a plurality of outstanding tabs mounted with each of said side walls located adjacent each of the opposing edges of each of said side walls;
  a pair of fixed outstanding support flanges perpendicularly mounted with each opposing end walls, each of said outstanding support flanges having a side edge located adjacent each of the side edges of said side walls;
  each of said end walls having a plurality of openings extending therethrough located adjacent each of said side edges, each of said openings being arranged to receive one of said tabs from one of said side walls wherein said side walls and said end walls are releasably interlocked in the erected position, each of said support flanges being disposed outwardly from each of said side walls.

3. The apparatus as set forth in claim 2, wherein:
  each of said tabs is attached to a side edge of each of said side walls and extends outwardly therefrom a predetermined distance at an angle less than 90° to an outer surface of each of said side walls; and
  each of said tabs is resiliently deformable to provide a releasable interlocking relationship when received in each of said openings for securing said side walls with said end walls.

4. The apparatus as set forth in claim 3, wherein:
  each of said side walls has a pair of upper tabs disposed a predetermined distance from the upper edge and a pair of lower tabs disposed a predetermined distance from the bottom edge; and
  each of said end walls has a pair of openings disposed a predetermined distance from its upper edge and a pair of lower openings disposed a predetermined distance from its bottom edge.

5. The apparatus as set forth in claim 4, wherein:
  each of said end walls has an inner surface with a plurality of outwardly extending abutments mounted therewith positioned adjacent each of said openings for forcibly holding the tabs received therein in the interlocked position.

6. The apparatus as set forth in claim 1, wherein said means for forming a plurality of fixed upstanding reinforced corners includes:
  a plurality of fixed upstanding corner walls, each mounted with said base member and with one of said opposing fixed upstanding end flanges, each of said corner walls having a bottom edge located adjacent one of said side edges and a side located adjacent one of the end edges of each of said end flanges, each of said corner walls cooperating with said base member and each of the opposing fixed end flanges to form said plurality of upstanding reinforced corners.

7. The apparatus of claim 1, including:
  means mounted with each of the opposing end walls, opposing side walls and base member for reinforcing each of said members to provide increased vertical and horizontal strength thereto.

8. The apparatus of claim 7, wherein said means for reinforcing includes:
  a plurality of fixed outstanding reinforcing ribs perpendicularly mounted with an outside surface of each of said end walls, side walls and base member, each of said reinforcing ribs extending an equal predetermined distance from each of said outer surfaces.

9. The apparatus as set forth in claim 1, wherein said cooperating means for preventing inadvertent relative movement includes:
  a plurality of fixed upstanding fingers perpendicularly mounted with an upper surface of said lid of said lid member each of said fingers extending a predetermined distance from said lid upper surface and being positioned at a predetermined position thereon; and
  a plurality of outwardly extending reinforcing ribs perpendicularly attached to a bottom surface of said base member and extending outwardly therefrom an equal predetermined distance, said reinforcing ribs being attached to each other to form a plurality of recesses adjacent said bottom surface which are adapted for receiving a plurality of fingers of a lid member of a corresponding collapsible shipping container upon which said base member is disposed when said container is vertically stacked relative to the corresponding collapsible shipping container wherein said inadvertent relative movement of the vertically stacked containers is prevented when the opposed side walls and end walls of said transporting member are in the collapsed position and the erected position.

10. The apparatus of claim 1, wherein:
  said fixed outwardly extending peripheral flange of said lid member has an inner surface for sealing with said pair of said walls and said pair of end walls to prevent entry of undesirable contaminants into said shipping receptacle.

11. The apparatus as set forth in claim 1, wherein said collapsible shipping container is formed of linear polyethylene.

12. The apparatus as set forth in claim 11, wherein said shipping container is colored a desired color to identify the type of cargo shipped therein.

13. The apparatus as set forth in claim 1, wherein said opposed end walls have equal predetermined heights of less than half of the length of said base member.

14. The apparatus of claim 1, wherein said opposing side walls have equal predetermined heights equal to less than the width of said base member whereby said side walls are arranged in an overlapping arrangement adjacent the base member in the collapsed position.

15. The apparatus as set forth in claim 14, wherein the height of each of said end walls and side walls are such to provide a shipping receptacle having an equal predetermined height when said side walls and end walls are in the erected position.

* * * * *